United States Patent
Suzuki et al.

(10) Patent No.: US 6,807,448 B1
(45) Date of Patent: Oct. 19, 2004

(54) WEIGHT IDENTIFICATION METHOD AND FEEDBACK CONTROL METHOD

(75) Inventors: Toshinari Suzuki, Aichi-ken (JP); Katsumi Kono, Toyota (JP); Ryoichi Hibino, Aichi-ken (JP); Masataka Osawa, Aichi-ken (JP); Eiichi Ono, Aichi-ken (JP); Shu Asami, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 443 days.

(21) Appl. No.: 09/596,067

(22) Filed: Jun. 16, 2000

(30) Foreign Application Priority Data

Jun. 22, 1999 (JP) .......................................... 11-175032

(51) Int. Cl.$^7$ .............................................. G05B 13/02
(52) U.S. Cl. ............................. 700/28; 700/31; 700/44; 700/45
(58) Field of Search .............................. 700/28, 29, 31, 700/32, 44–45, 47–48, 52, 54; 706/16, 25; 701/67–68, 51, 58–61; 703/2

(56) References Cited

U.S. PATENT DOCUMENTS 5,494,345 A * 2/1996 Inagaki et al. ............... 303/163
5,761,626 A * 6/1998 Tascillo et al. ............... 701/29
6,132,336 A * 10/2000 Adachi et al. ............... 477/169
6,275,761 B1 * 8/2001 Ting ............................. 701/59
6,449,548 B1 * 9/2002 Jain et al. ...................... 701/56
6,490,511 B1 * 12/2002 Raftari et al. ................. 701/22

FOREIGN PATENT DOCUMENTS

| JP | 1-252103 | 10/1989 |
|----|----------|---------|
| JP | 6-222839 | 8/1994 |
| JP | 7-35210 | 2/1995 |
| JP | 10-110818 | 4/1998 |

* cited by examiner

*Primary Examiner*—Anthony Knight
*Assistant Examiner*—Ronald D Hartman, Jr.
(74) *Attorney, Agent, or Firm*—Oblon, Spivak, McClelland, Maier & Neustadt, P.C.

(57) ABSTRACT

An instruction value Duty for bringing a slip rotation speed Nslip to a target rotation speed is feedback-controlled based on a difference e between the slip rotation speed Nslip and the target rotation speed, and a weight $\theta$ from a parameter map. Weights $\theta$ are assigned individually to a plurality of models, each of which includes a group of parameters and which are used to form a control model that represents a slip control system. Based on a weight that is assigned to one of the plurality of models, a weight that is assigned to at least one model that is other than the one of the plurality of models is specified. Thus, the amount of calculation required can be reduced by estimating weights for the models including the groups of parameters, which contain parameters that are used to construct the control model, instead of directly estimating the control model-constructing parameters.

9 Claims, 6 Drawing Sheets

WEIGHT IDENTIFICATION METHOD AND FEEDBACK CONTROL METHOD

INCORPORATION BY REFERENCE

The disclosure of Japanese Patent Application No. HEI 10-175032 filed on Jun. 22, 1999 including the specification, drawings and abstract is incorporated herein by reference in its entirety.

BACKGROUND OF THE INVENTION

1. Field of the Invention

The present invention relates to a weight identification method and a feedback control method. More specifically, the invention relates to a weight identification method for identifying weights that are assigned individually to a plurality of models, each of which includes a group of parameters and which are used to construct a control model representing a control system, and a feedback control method, based on a target value for controlling the control system, for a value of response of the control system controlled based on the target value, and weights assigned individually to the plurality of models, each of which includes the group of parameters and which are used to construct the control system, feedback-controlling such an instruction value for the control system that the value of response becomes equal to the target value.

2. Description of the Related Art

A related-art vehicular continuously variable transmission (CVT) has a CVT unit that includes a speed-shift hydraulic pressure controller, an input-side pulley, a metallic belt, an output-side pulley, and the like, and a controller that controls the speed-shift hydraulic pressure controller. That is, the controller performs the speed-shift control by controlling the speed-shift hydraulic pressure controller. In this CVT, it is necessary to individually adjust various characteristics. Therefore, parameters of the controller need to be set in accordance with characteristics of the CVT unit. Specifically, parameters of the controller are determined by inputting target rotation speeds to the CVT unit stepwise, and measuring the response rotation speeds. Then, in order to realize the thus-determined parameters of the controller, the CVT unit is altered.

If the transmission coefficient of the CVT unit is unknown, it is necessary to measure step response rotation speeds under various conditions in order to determine the parameters of the controller. However, since the characteristics of the CVT unit vary depending on the pulley-pressing force or the location of the point of equilibrium, the setting of optimal parameters is not easy, and requires a great amount of time. After such cumbersome setting of parameters, it is still difficult to achieve satisfactory performance over the entire operation range.

Therefore, according to the conventional art, a control system having the CVT unit and the controller is approximated by equation (1):

$$\text{Transfer function: } Gr(s) = \frac{Krwn^2}{S^2 + 2\zeta wnS + wn^2} \quad (1)$$

where Kr=a constant,
ωn=the natural angular frequency,
ζ=the damping coefficient, and
S=the Laplace operator In equation (1), the constant Kr, the natural angular frequency ωn and the damping coefficient ζ are estimated directly from the target rotation speed determined from the throttle opening extent and the actual rotation speed of the output-side pulley, and the actually measured rotation speed. Japanese Patent Application Laid-Open No. HEI 7-35210 proposes that parameters of the controller expressable by the constant Kr, the natural angular frequency ωn and the damping coefficient ζ be adjusted so that constant Kr, the natural angular frequency ωn and the damping coefficient ζ assume desirable values that are determined by the target rotation speed and the actually measured rotation speed.

Normally, a control object has a non-linear characteristic. In a slip control system, as for example, characteristics of the controller vary depending on the engine speed, the vehicle speed, the engine load, the oil temperature, aging changes, or the like. Due to the compensation for such variations of characteristics, it is difficult in the stage of designing a controller to improve the responsiveness of the controller. Furthermore, the designing of the controller requires a great amount of time.

The use of the related art, which identifies and automatically adjusts control parameters in accordance with the characteristics of a model, improves the controllability and reduces the time required for the design.

However, in the related art, the constant Kr, the natural angular frequency ωn and the damping coefficient ζ of the control object are directly identified. Therefore, as the order of the Laplace operator S increases depending on the range of approximation of the control object, the number of parameters that need to be estimated increases. As a result, the amount of calculation, the program size, and the memory capacity required increase, thereby causing a packaging problem. Furthermore, there arises a danger that during the process of estimating a parameter, the estimated value may be incorrect.

SUMMARY OF THE INVENTION

Accordingly, it is an object of the invention to provide a weight identification method and a feedback control method that reduce the amount of calculation by estimating weights on models having groups of parameters that contain parameters that construct a control model, instead of directly estimating the control model-constructing parameters.

To achieve the aforementioned and other objects, one aspect of the invention provides a weight identification method that identifies weights assigned to a plurality of models, each of which includes a group of parameters. The method identifies a first weight assigned individually to a plurality of models each. Based on the first weight that is assigned to one of the plurality of models, the weight identification method specifies a second weight that is assigned to at least one model that is other than the one of the plurality of models.

That is, in the invention, first and second weights that are assigned individually to the plurality of models are identified. The plurality of models are used to form a control model representing a control system, and each includes a group of parameters.

In the invention, based on the first weight assigned to one of the models, the second weight that is assigned to at least one model that is other than the one of the models is specified. For example, the second weight that is assigned to at least one model that is other than the one of the models may decrease if the first weight assigned to the one of the model is increased. For example, if the number of the models is two, the first weight θ1 of one of the two models and the second weight θ2 of the other model may have a relationship of θ1=1−θ2. If three models are provided, the weights θ1, θ2 and θ3 of the three models may have a relationship of θ3=1−(θ1+θ2). The number of models is not limited to two or three. Thus, the weight assigned to each model may be a value that is greater than or equal to "0" and less than or equal to "1", so that divergence of an estimated value can be prevented.

Therefore, since the first weight assigned to one of a plurality of models specifies a second weight that is assigned to at least one model that is other than the one of the plurality of models, the weight identification method eliminates the need to specify the weights of all the models, and therefore reduces the amount of calculation required.

The weight identification method of the invention is applicable to a feedback control method.

That is, another aspect of the invention provides a feedback control method, based on a target value for controlling a control system, for determining an amount of control of the control system controlled based on the target value, and determining weights assigned individually to a plurality of models each of which includes the group of parameters and which form a control model representing the control system, and feedback-controlling such an instruction value for the control system that the amount of control becomes substantially equal to the target value. Based on a weight that is assigned to one of the plurality of models, the feedback control method specifies a weight that is assigned to at least one model that is other than the one of the plurality of models.

In the feedback control method, the weight assigned to at least one model other than the one of the models may decrease if the weight assigned to the one of the model is increased. Furthermore, the weights assigned individually to the plurality of models may be estimated based on a difference between the target value and the amount of control, and a difference of the instruction value from a value of equilibrium.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF A PREFERRED EMBODIMENT

Figure 1:
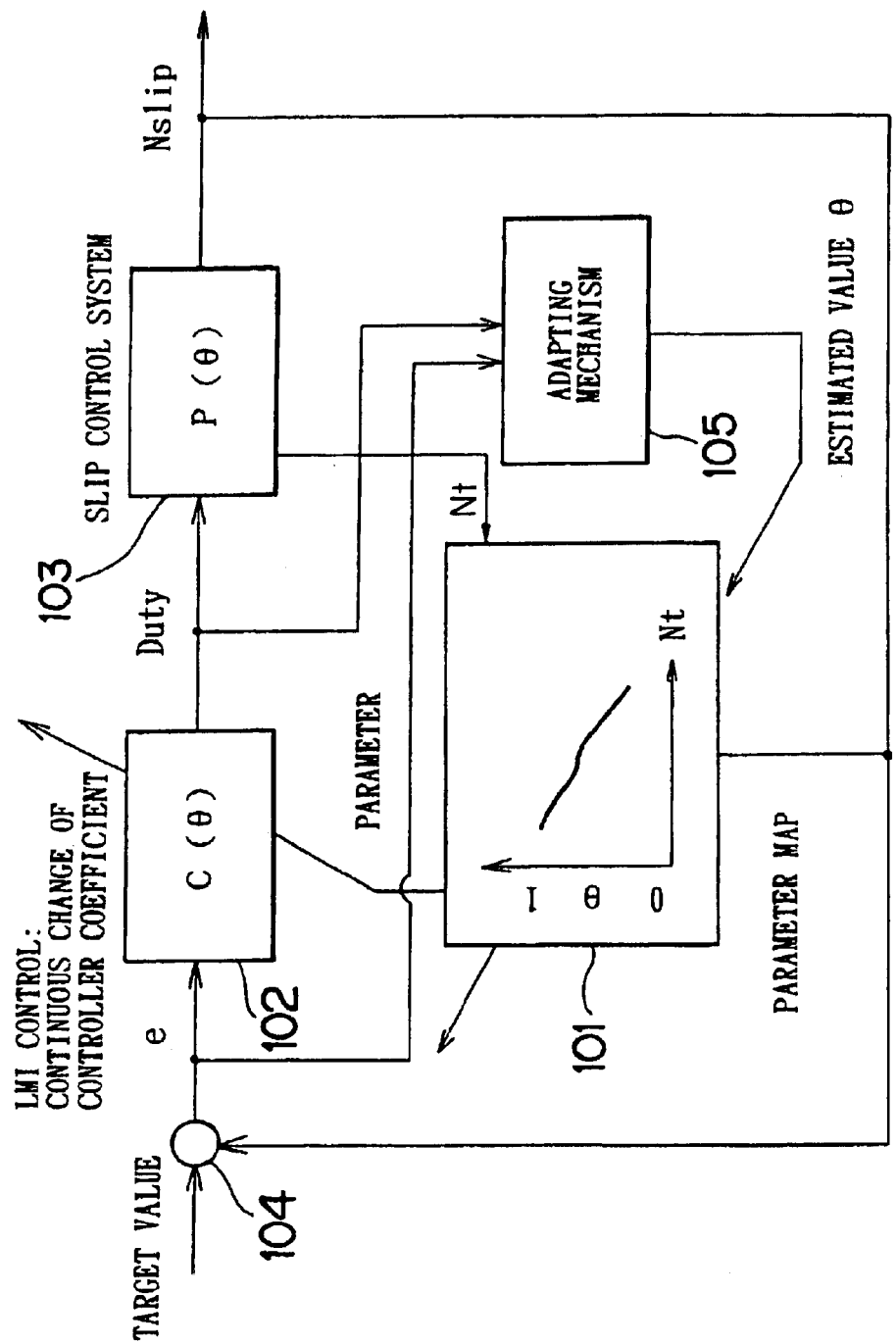
FIG. 1 is a block diagram of a preferred embodiment of the invention.

A preferred embodiment of the invention will be described hereinafter with reference to the accompanying drawings. In this embodiment, the weight identification method and feedback control method of the invention are applied to a slip control apparatus of a clutch. However, the invention is applicable not only to a clutch slip control apparatus but also to other apparatuses such as a CVT, and the like.

The clutch slip control apparatus of this embodiment has a slip control system 103 of a control system (e.g., a hydraulic valve control mechanism, and the like) of a clutch, a calculator 104, and a controller 102. The calculator 104 calculates a difference e between a target rotation speed and a slip rotation speed Nslip, that is, a response from the slip control system 103. Based on the difference e between the slip rotation speed Nslip and the target rotation speed, and a weight θ described later, the controller 102 performs feedback control of an instruction value Duty for controlling the slip control system 103 so that the slip rotation speed Nslip becomes equal to the target rotation speed.

The slip control system 103 of the clutch also has an adapting mechanism 105, and a parameter map 101. The adapting mechanism 105 accepts input of the difference e between the slip rotation speed Nslip and the target rotation speed and the instruction value Duty, and estimates a weight a based on the difference e between the slip rotation speed Nslip and the target rotation speed, and a difference of the instruction value Duty from a value of equilibrium. The parameter map 101 accepts input of the weight θ from the adapting mechanism 105, and updates the quantity of state θ determined based on the state of operation Nt of the slip control system 103 with reference to the parameter map 101, by using the input weight θ, if the state of control of the slip control system 103 and the quantity of state θ are stable. The parameter map 101 then outputs the weight θ to the controller 102. If the state of control of the slip control system 103 is unstable, the parameter map 101 determines the quantity of state θ based on the operation state Nt of the slip control system 103 with reference to the map, and outputs the determined weight θ to the controller 102.

The weight will next be described. Weights are assigned individually to a plurality of models each of which includes a group of parameters for constructing a control model that represents the slip control system 103. That is, a control model that represents the slip control system 103 can be expressed by combining phase-delay models (A1–D1) and phase advancement models (A2–D2), that is, by forming a linear parameter varying (LPV) model, as in equation (2).

$$P(\theta): \begin{cases} x[k+1] = A \times x[k] + B \times Duty[k] \\ Nslip[k] = C \times x[k] + D \times Duty[k] \end{cases} \quad (2)$$

where $\theta \in R^{1 \times 1}$, $0 \leq \theta \leq 1$, $A = \theta \times A1 + (1 \cdot \theta) \times A2$, $B = \theta \times B1 + (1 \cdot \theta) \times B2$, $C = \theta \times C1 + (1 \cdot \theta) \times C2$, $D = \theta \times D1 + (1 \cdot \theta) \times D2$, $$A1 = \begin{bmatrix} a11 & 1 & 0 \\ a12 & 0 & 1 \\ a13 & 0 & 0 \end{bmatrix} \quad B1 = \begin{bmatrix} b11 \\ b12 \\ b13 \end{bmatrix} \quad A2 = \begin{bmatrix} a21 & 1 & 0 \\ a22 & 0 & 1 \\ a23 & 0 & 0 \end{bmatrix} \quad B1 = \begin{bmatrix} b21 \\ b22 \\ b23 \end{bmatrix}$$

$c1 = [1 \ 0 \ 0] \quad D1 = [0] \quad C2 = [1 \ 0 \ 0] \quad D2 = [0]$ where the parameters of each control model are known as shown in Table 1.

TABLE 1

| | Phase delay model (A1, B1) | | Phase advancement model (A2, B2) |
|---|---|---|---|
| a11 | 2.4898 | a21 | 2.4142 |
| a12 | −2.1529 | a22 | −2.0860 |
| a13 | 0.6552 | a23 | 0.6411 |
| b11 | −0.0024 | b21 | −0.0092 |
| b12 | −0.0038 | b22 | −0.0145 |
| b13 | 0.0316 | b23 | 0.1217 |

The operation of the embodiment will now be described. The controller 102 determines an instruction value Duty for controlling the slip control system 103 so that the slip rotation speed Nslip becomes equal to the target rotation speed. Then, the controller 102 outputs the instruction value Duty to the slip control system 103 to control the slip control system 103. Being thus controlled, the slip control system 103 outputs a slip rotation speed Nslip as a response. The calculator 104 calculates a difference e between the slip rotation speed Nslip inputted from the slip control system 103 and the target rotation speed.

Then, based on the difference e between the slip rotation speed Nslip and the target rotation speed, and the weight θ inputted from the parameter map 101, the controller 102 feedback-controls the slip control system 103. For the feedback control, the instruction value Duty for bringing the slip rotation speed Nslip to the target rotation speed is used.

The adapting mechanism 105 estimates (identifies) a weight θ based on the difference e between the slip rotation speed Nslip and the target rotation speed and the difference of the instruction value Duty from the value of equilibrium. The parameter map 101 accepts input of the weight θ. If the quantity of state θ and the state of control of the slip control system 103 are stable, the parameter map 101 updates the weight θ determined from the operation state Nt of the slip control system 103 by the parameter map 101, by using the input weight θ. Then, the parameter map 101 outputs the weight θ to the controller 102. If the state of control of the slip control system 103 is unstable, the parameter map 101 determines the value θ from the operation state Nt of the slip control system 103 with reference to the map, and outputs the thus-determined value θ to the controller 102.

A method performed by the adapting mechanism 105 to identify the weight θ will next be described. The adapting mechanism 105 accepts input of the difference e [k] between the slip rotation speed Nslip and the target rotation speed, and the instruction value Duty. The adapting mechanism 105 determines a deviation u [k] between the instruction value Duty and the value of equilibrium determined by removing an amount of variation in the instruction value Duty through the use of a low-pass filter (not shown). Based on the difference e [k] between the slip rotation speed Nslip and the target rotation speed and the deviation u [k] between the instruction value Duty and the value of equilibrium of the instruction value Duty, the adapting mechanism 105 identifies a weight θ by the sequential-type method of least squares using equations (3) to (7).

$$y[k] = -e[k] + a21 \times e[k-1] + a22 \times e[k-2] + a23 \times e[k-3] + b21 \times u[k-1] + b22 \times u[k-2] + b23 \times u[k-3] \quad (3)$$

$$\phi[k] = -(a11-a21) \times e[k-1] - (a12-a22) \times e[k-2] - (a13-a23) \times e[k-3] - (b11-b21) \times u[k-1] - (b12-b22) \times u[k-2] - (a13-a23) \times u[k-3] \quad (4)$$

$$L[k] = \frac{P[k] \times \phi[k]}{\lambda + \phi[k] \times P[k] \times \phi[k]} \quad (5)$$

$$\theta[k+1] = \theta[k] + L[k] \times (y[k] - \phi[k] \times \theta[k]) \quad (6)$$

$$P[k+1] = \frac{P[k] - P[k] \times \phi[k] \times L[k]}{\lambda} \quad (7)$$

The initial values of the variables, and the sampling times are shown in Table 2.

TABLE 2

| Item | Value (physical value) |
|---|---|
| L (0) | 0 |
| θ (0) | 0 |
| Sampling time | 32 msec |

In this manner, the weights of the phase-delay and phase-advancement models, which are combined to represent the slip control system, are identified. Therefore, the need to directly identify parameters of the models is eliminated, so that the amount of calculation is reduced.

Furthermore, since each weight is determined as a value greater than or equal to "0" and less than or equal to "1", divergence of an estimated value is prevented.

Figure 2A:
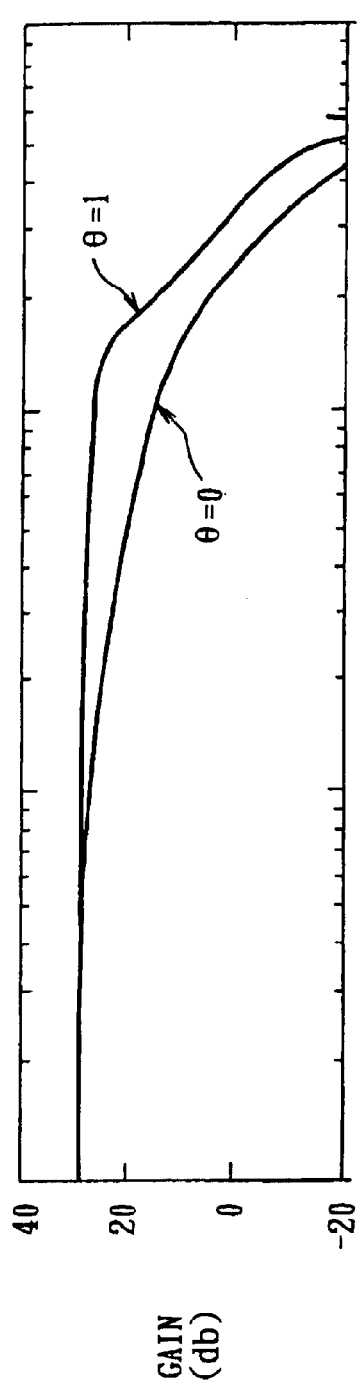
FIG. 2A is a graph indicating the gain (amplitude) of the slip rotation speed Nslip, with a transfer characteristic of an upper and lower limit model (θ=0, 1)
Figure 2B:
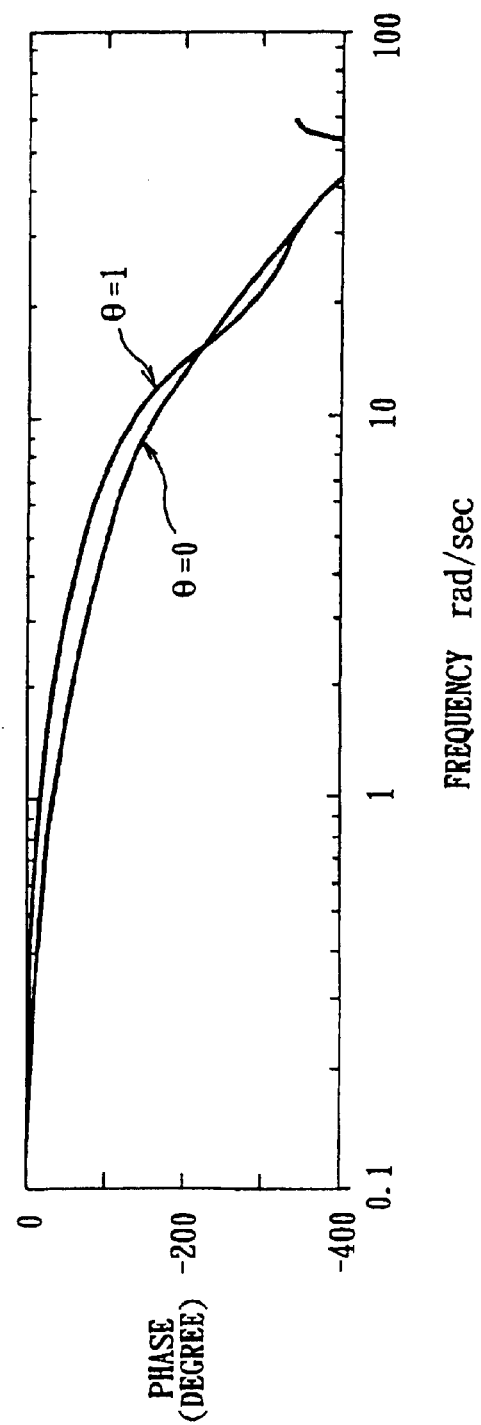
FIG. 2B s a graph indicating the phase of the slip rotation speed Nslip, with the transfer characteristic of the upper and lower limit model (θ=0, 1)

The characteristic of transfer from the instruction value Duty to the slip rotation speed Nslip can be expressed in regions of frequency as in FIGS. 2A and 2B. That is, if θ=0, the control model of the slip control system 103 is formed only by the phase delay model. If θ=1, the control model of the slip control system 103 is formed only by the phase advancement model.

Figures 3A, 3B:
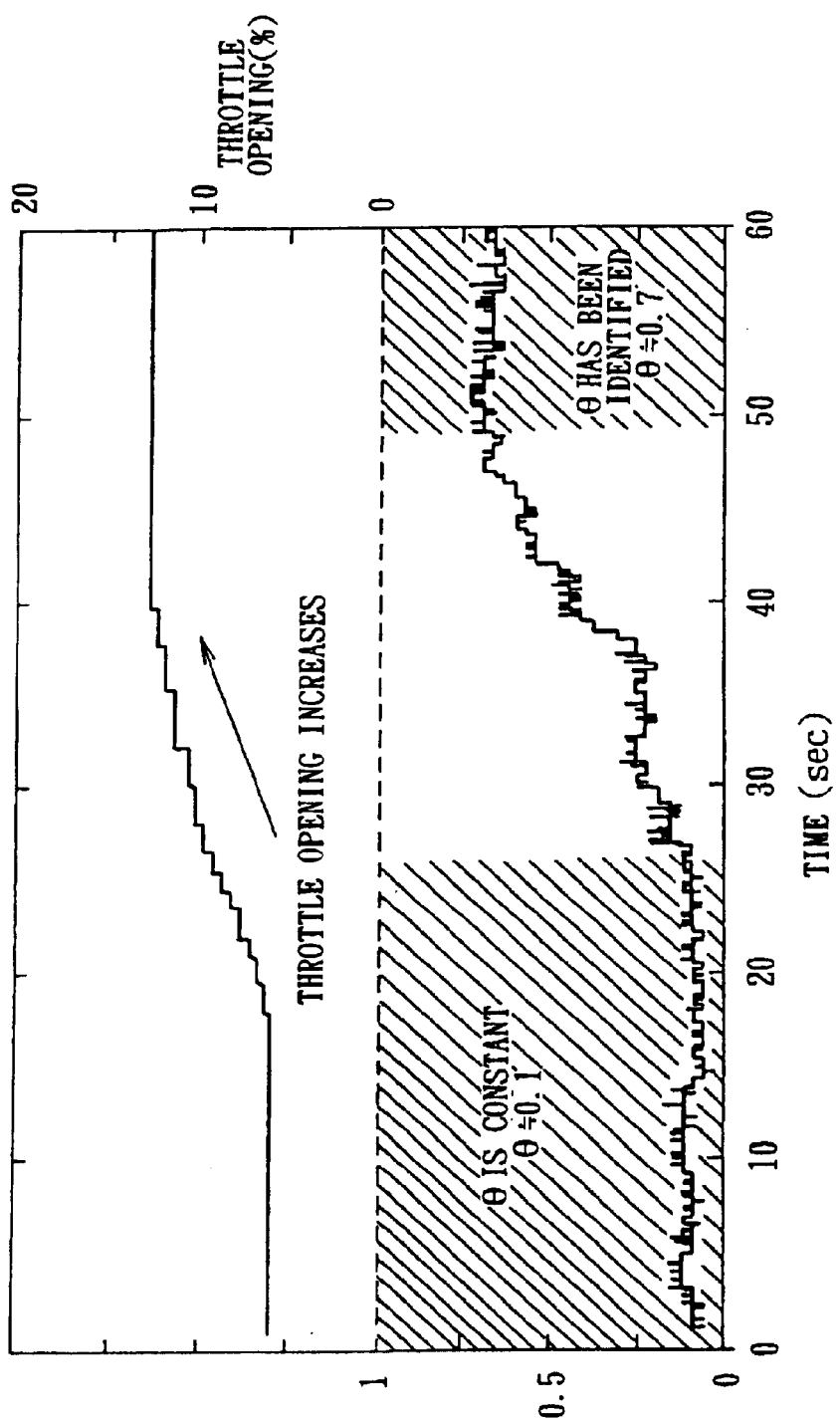
FIGS. 3A and 3B are graphs indicating results of on-line identification of a weight θ.

If the state of control of the slip control system 103 is unstable, that is, if the throttle opening changes as indicated in FIG. 3A, the weight θ changes as indicated in FIG. 3B with changes in the throttle opening. If the state of control of the slip control system 103 is stable, that is, if the throttle opening remains unchanged, the weight θ is fixed or identified as a constant value by the adapting mechanism 105.

Figure 4A:
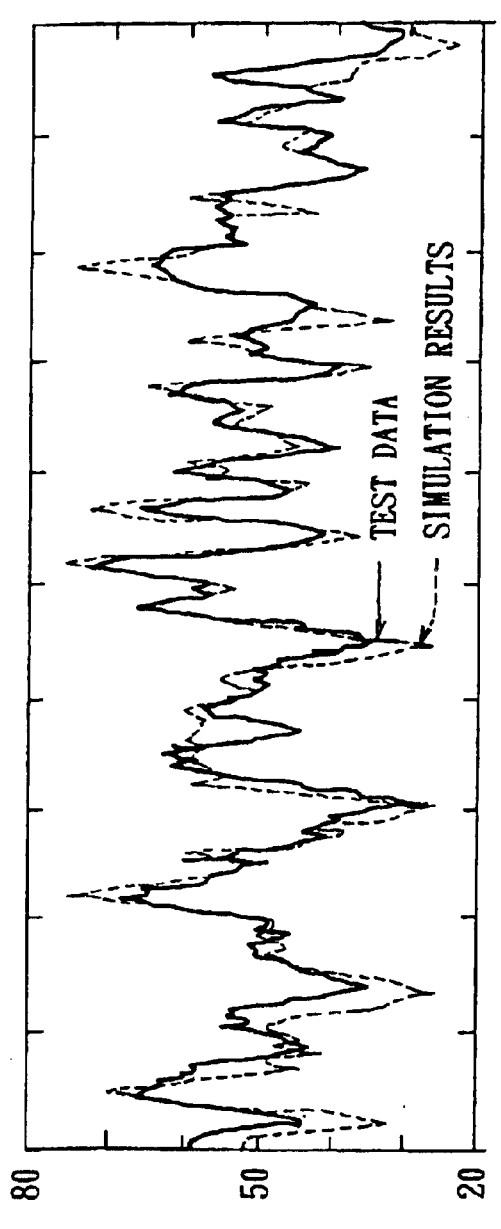
FIGS. 4A and 4B are graphs indicating a comparison between test data and a simulation of a model (θ=0.1)
Figure 4B:
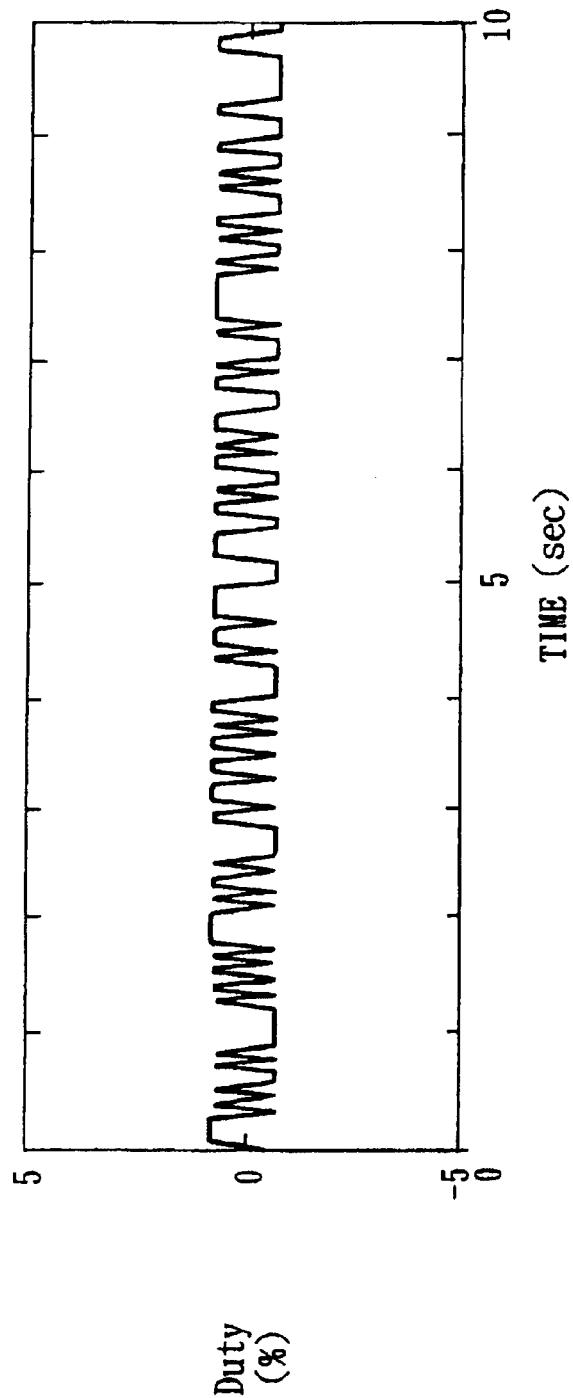
Figure 5A:
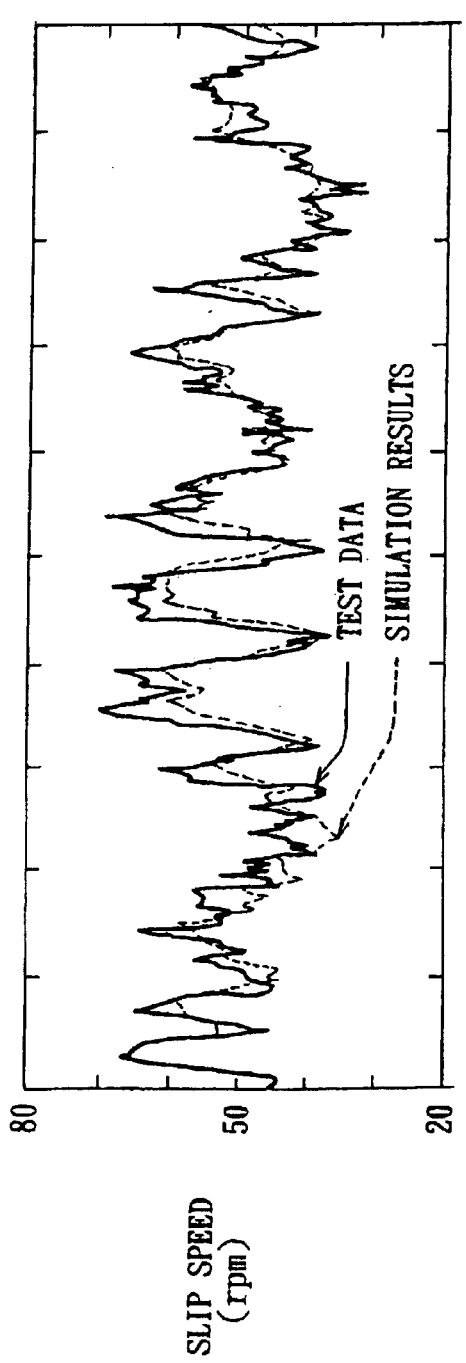
FIGS. 5A and 5B are graphs indicating a comparison between test data and a simulation of a model (θ=0.7)
Figure 5B:
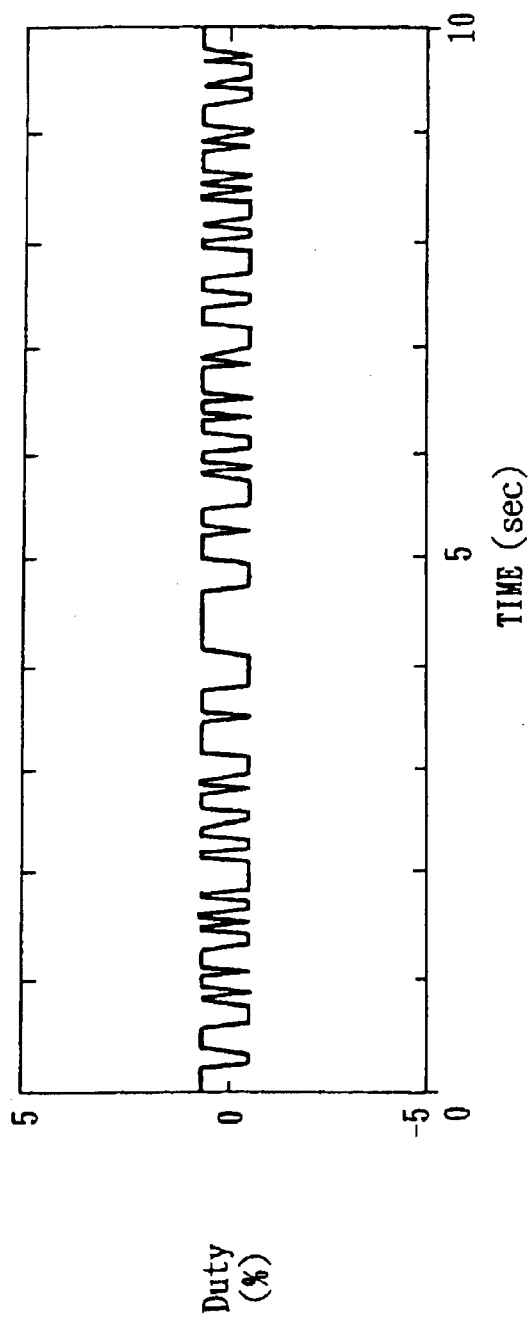

Results of the comparison of a simulation of a model (θ=0.1) and test data (turbine speed=1781 rpm, slip speed=50 rpm, throttle opening=6%) are indicated in FIGS. 4A and 4B. Results of the comparison of a simulation of a model (θ=0.7) and test data (turbine speed=1781 rpm, slip speed=50 rpm, throttle opening=13%) are indicated in FIGS. 5A and 5B. From the results of the comparisons, it is apparent that in the models determined in a good manner through identification of the value θ, simulation data indicated by broken lines is in better agreement with the test data indicated by solid lines.

Japanese Patent Application Laid-Open No. HEI 1-252103 proposes, in conjunction with a pulse-width-modulation VVVF inverter control circuit, a device that is formed by a series circuit of a first differential compensator, a second differential compensator and a primary delay compensator for achieving a damping effect on a main circuit. In this device, it is necessary to directly determine coefficients of the second differential compensator and the primary delay compensator. The embodiment described above differs from the related-art device in that, in the embodiment, a weight assigned to one of the two models, that is, the phase delay model and the phase advancement model that are combined to form the control model representing the slip control system, is specified by the weight assigned to the other model. Therefore, if many parameters need to be determined, the embodiment advantageously allows a control model of the slip control system to be identified by determining a reduced number of weight coefficients, and therefore eliminates the need to increase the amount of calculation, the program size, or the memory capacity.

Figure 6:
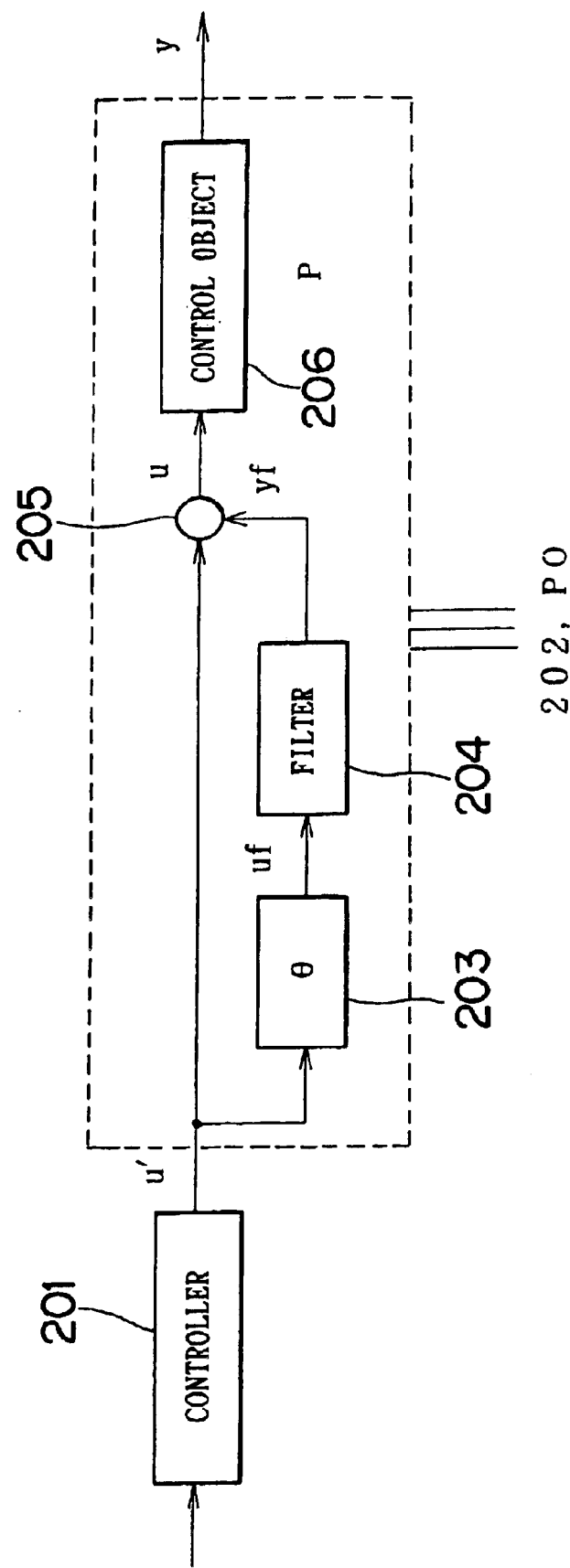
FIG. 6 is a block diagram according to a modification of the embodiment.

The weight identification method of the invention is not limited to the foregoing embodiment, but may also be applied to a problem of identification indicated in FIG. 6, that is, estimation of such a weight θ that the transfer function of u'→y is always P0 regardless of variations of characteristics of a control object. An advantage of a construction shown in FIG. 6 is that the characteristic of transfer from a controller 201 to an output y is constant regardless of variations of characteristics of the control object and, therefore, the responsiveness and robustness can be improved by using a fixed gain controller.

A P0 filter is expressed as in equation (8).

$$P0: \begin{cases} x[k+1] = A \times x[k] + B \times u[k] \\ y[k] = C \times x[k] + D \times u[k] \end{cases} \quad (8)$$

where $$A = \begin{bmatrix} \alpha 1 & 1 & 0 \\ \alpha 2 & 0 & 1 \\ \alpha 3 & 0 & 0 \end{bmatrix} \quad B = \begin{bmatrix} \beta 1 \\ \beta 2 \\ \beta 3 \end{bmatrix} \quad C = [1 \ 0 \ 0] \quad D = [0]$$

$$\text{filter: } yf[k] = \frac{b0 + b1 \cdot z^{-1} + b2 \cdot z^{-2}}{1 + a1 \cdot z^{-1} + a2 \cdot z^{-2}} u \cdot f[k]$$

Based on the relation ship of P0=filter×P, equations (3) and (4) can be rewritten into equation (9) and (10) of y[k] and ([k], so that θ can be estimated as in the foregoing embodiment.

$$y[k] = -1 - (a1 - \alpha 1) \times e[k-1] - \quad (9)$$
$$(a2 - a1\alpha 1 - \alpha 2) \times e[k-2] - (-a2\alpha 1 - a1\alpha 2 - \alpha 3) \times e[k-3] -$$
$$(-a2\alpha 2 - a1\alpha 3) \times e[k-4] - (-a2\alpha 3) \times e[k-5] + \beta 1 \times u[k-1] +$$
$$(\beta 2 + a1\beta 1) \times u[k-2] + (\beta 3 + a1\beta 2 + a2\beta 1) \times u[k-3] +$$
$$(a1\beta 3 + a2\beta 2) \times u[k-4] + a2\beta 3 \times u[k-5]$$

$$\phi[k] = b0 + (b1 - b0\alpha 1) \times e[k-1] + (b2 - b1\alpha 1 - b0\alpha 2) \times e[k-2] + \quad (10)$$
$$(-b2\alpha 1 - b1\alpha 2 - b0\alpha 3) \times e[k-3] +$$
$$(-b2\alpha 2 - b1\alpha 3) \times e[k-4] + (-b2\alpha 3) \times e[k-5]$$

Although in the foregoing embodiment, a control model that represents a control system is expressed or formed by two models, the invention is not restricted by the embodiment or modification. According to the invention, a control model that represents a control system may also be expressed or formed by more than two models. In such a case, "A" in equation (2) may also be expressed as in:

$$A = \theta 1A1 + \theta 2A2 + \theta 3A3$$
$$= \theta 1A1 + \theta 2A2 + (1 - \theta 1 - \theta 2)A3$$

While the present invention has been described with reference to what is presently considered to be a preferred embodiment thereof, it is to be understood that the present invention is not limited to the disclosed embodiment or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A feedback control method comprising:
    preparing a plurality of models, each of which includes at least a phase-delay model and a phase advancement model and is represented by combining the phase delay model and the phase advancement model;
    identifying a first weight that is assigned to one of the plurality of models;
    specifying a second weight that is assigned to at least one model that is other than the one of the plurality of models, based on the first weight;
    forming a control model of the plurality of models, the control model representing a control system; and
    feedback-controlling, based on a target value for controlling the control system, an amount of control of the control system controlled based on the targets value, the first and second weights, an instruction value for the control system that the amount of control becomes substantially equal to the target value,
    wherein the first weights assigned individually to the plurality of models are estimated based on a difference between the target value and the amount of control and a deviation between the instruction value and the value of equilibrium of the instruction value and parameters showing, phase delay models and parameters showing phase advancement models.

2. A feedback control method according to claim 1, wherein the first weight and the second weight each have a value that is greater than or equal to zero and less than or equal to one.

3. A feedback control method according to claim 1, wherein the first weight and second weight each have a value that is greater than or equal to zero and less than or equal to one.

4. A feedback control method according to claim 1, wherein in a control of a slip control apparatus of a clutch, the slip control apparatus is feedback-controlled based on the first and second weights so that a slip rotation speed of the slip control apparatus becomes substantially equal to a target rotation speed.

5. A feedback control method according to claim 1, wherein in a control of a slip control apparatus of a clutch, the slip control apparatus is feedback-controlled based on the first and second weights so that a slip rotation speed of the slip control apparatus becomes substantially equal to a target rotation speed, wherein the first and second weights are estimated based on a difference between the slip rotation speed and the target rotation speed, and a deviation of the instruction value for the slip control apparatus from a value of equilibrium of the instruction value.

6. A feedback control method according to claim 1, wherein in a control of a vehicular continuously variable transmission, the vehicular continuously variable transmission is feedback-controlled based on the first and second weights so that a rotation speed of the vehicular continuously variable transmission becomes substantially equal to a target rotation speed.

7. A feedback control method according to claim 1, wherein in a control of a vehicular continuously variable transmission, the vehicular continuously variable transmission is feedback-controlled based on the first and second weights so that a rotation speed of the vehicular continuously variable transmission becomes substantially equal to a target rotation speed, wherein the first and second weights are estimated based on a difference between the rotation speed of vehicular continuously variable transmission and the target rotation speed, and a deviation of the instruction value for the vehicular continuously variable transmission from a value of equilibrium of the instruction value.

8. A feedback control method according to claim 1, wherein the first weight is identified by a sequential method of least squares.

9. A feedback control method according to claim 1, wherein if the first weight assigned to the one of the plurality of models increases, the second weight assigned to the at least one model that is other than the one of the plurality of models decreases.

* * * * *